(12) United States Patent
Sirkis

(10) Patent No.: US 6,453,108 B1
(45) Date of Patent: Sep. 17, 2002

(54) ATHERMAL BRAGG GRATING PACKAGE WITH COURSE AND FINE MECHANICAL TUNING

(75) Inventor: James S. Sirkis, Wallingford, CT (US)

(73) Assignee: CiDRA Corporation, Wallingford, CT (US)

( * ) Notice: Subject to any disclaimer, the term of this patent is extended or adjusted under 35 U.S.C. 154(b) by 33 days.

(21) Appl. No.: 09/677,518

(22) Filed: Sep. 30, 2000

(51) Int. Cl.⁷ .............................. G02B 6/00; G02B 6/34
(52) U.S. Cl. ......................................... 385/136; 385/37
(58) Field of Search ........................................... 385/37

(56) References Cited

U.S. PATENT DOCUMENTS

| | | | |
|---|---|---|---|
| 3,190,108 A | 6/1965 | Ormond | 73/1 |
| 3,318,593 A | 5/1967 | Guernet | 269/60 |
| 3,849,857 A | 11/1974 | Murray, Jr. | 29/200 |
| 4,012,030 A | 3/1977 | Hesselgren | 269/60 |
| 4,193,317 A | 3/1980 | Oono et al. | 74/479 |
| 4,593,969 A | 6/1986 | Goodman et al. | 350/96.19 |
| 4,636,031 A | 1/1987 | Schmadel, Jr. et al. | 350/96.19 |

(List continued on next page.)

FOREIGN PATENT DOCUMENTS

| | | |
|---|---|---|
| WO | WO9530926 | 11/1995 |
| WO | WO0037914 | 6/2000 |
| WO | WO0037969 | 6/2000 |
| WO | WO0039617 | 7/2000 |

OTHER PUBLICATIONS

U.S. application Ser. No. 09/455,868, filing date: Dec. 6, 1999—Entitled: Large Diameter Optical Waveguide, Grating and Laser.

U.S. application Ser. No. 09/456,112, filing date: Dec. 6, 1999—Entitled: Compression–Tuned Bragg Grating Laser.

U.S. application Ser. No. 09/648,525. filing date: Aug. 26, 2000—Entitled: Optical Filter Having a Shaped Filter Function.

U.S. application Ser. No. 09/519,240, filing date: Mar. 6, 2000—Entitled: Temperature Compensated Optical Device.

U.S. application Ser. No. 09/751,589, filing date: Dec. 29, 2000—Entitled: Wide Range Tunable Optical Filter.

U.S. application Ser. No. 09/519,802, filing date: Mar. 6, 2000—Entitled: Tunable Optical Structure Featuring Feedback and Laser.

U.S. application Ser. No. 09/648,524, filing date: Aug. 26, 2000—Entitled: Wide Range Tunable Optical Filter.

U.S. application Ser. No. 09/707,084, filing date: Nov. 6, 2000—Entitled: Compression–Tuned Bragg Grating and Laser.

*Primary Examiner*—Hemang Sanghavi
*Assistant Examiner*—Scott Knauss
(74) *Attorney, Agent, or Firm*—Ware, Fressola, Van Der Sluys & Adolphson LLP

(57) ABSTRACT

An athermal grating design has a Bragg grating unit and a lever arrangement. In operation, the Bragg grating unit responds to an optical signal, a change of temperature and a lever force for offsetting thermally-induced changes in the Bragg grating unit, for providing a grating signal that does not change in relation to change of temperature. The lever arrangement responds to a change of temperature, for providing the level force to the grating to compensate for the change in the temperature. The Bragg grating unit includes a large diameter waveguide cane structure. The lever arrangement may include a top plate, a bottom plate, a lever arm pivotally coupled between the top plate and the bottom plate, and a rod coupled between the top plate and the bottom plate on one side of the lever arm. The Bragg grating unit is arranged between the top plate and the bottom plate on another side of the lever arm. The level arm and the rod have different coefficients of expansion.

13 Claims, 4 Drawing Sheets

CONCEPTUAL DRAWING OF LEVERED ATHERMAL GRATING PACKAGE THAT ALLOWS POST-MANUFACTURE TUNING TO ACHIEVE OPTIMAL ATHERMALIZATION

U.S. PATENT DOCUMENTS

| | | | |
|---|---|---|---|
| 4,725,110 A | 2/1988 | Glenn et al. | 350/3.61 |
| 4,807,950 A | 2/1989 | Glenn et al. | 350/3.61 |
| 5,007,705 A | 4/1991 | Morey et al. | 350/96.29 |
| 5,042,898 A * | 8/1991 | Morey et al. | 385/37 |
| 5,367,589 A | 11/1994 | MacDonald et al. | 385/37 |
| 5,388,173 A | 2/1995 | Glenn | 385/37 |
| 5,469,520 A | 11/1995 | Morey et al. | 385/37 |
| 5,579,143 A | 11/1996 | Huber | 359/130 |
| 5,682,445 A * | 10/1997 | Smith | 385/1 |
| 5,691,999 A | 11/1997 | Ball et al. | 372/20 |
| 5,694,503 A | 12/1997 | Fleming et al. | 385/37 |
| 5,757,540 A | 5/1998 | Judkins et al. | 359/341 |
| 5,812,716 A | 9/1998 | Ohishi | 385/92 |
| 5,815,299 A | 9/1998 | Bayart et al. | 359/171 |
| 5,844,174 A | 12/1998 | Kuhlmann et al. | 177/50 |
| 5,914,972 A | 6/1999 | Siala et al. | 372/33 |
| 5,991,483 A * | 11/1999 | Engelberth | 385/37 |
| 5,995,255 A | 11/1999 | Giles | 359/124 |
| 5,999,671 A | 12/1999 | Jin et al. | 385/37 |
| 6,016,702 A | 1/2000 | Maron | 73/705 |
| 6,031,950 A | 2/2000 | Fujita | 385/14 |
| 6,044,189 A | 3/2000 | Miller | 385/37 |
| 6,067,392 A | 5/2000 | Wakami et al. | 385/37 |
| 6,101,301 A * | 8/2000 | Engelberth et al. | 385/37 |
| 6,108,470 A | 8/2000 | Jin et al. | 385/37 |
| 6,112,553 A | 9/2000 | Poignant et al. | 65/41 |
| 6,118,914 A | 9/2000 | Davis et al. | 385/37 |
| 6,181,851 B1 * | 1/2001 | Pan et al. | 385/37 |
| 6,229,827 B1 * | 5/2001 | Fernald et al. | 372/20 |
| 6,337,932 B1 * | 1/2002 | Suhir | 35/13 |

* cited by examiner

THE BASIC INVENTION

CONCEPTUAL DRAWING OF LEVERED ATHERMAL GRATING PACKAGE THAT ALLOWS POST-MANUFACTURE TUNING TO ACHIEVE OPTIMAL ATHERMALIZATION

FIG.3: RELATIONSHIP BETWEEN THE CTE OF ROD 2 AND ROD 3 REQUIRED TO ACHIEVE ATHERMALIZATION FOR DIFFERENT LEVER ARM RATIOS ($L_4/L_5$). THIS DATA WAS CALCULATED ASSUMING $L_1=L_2=L_3$

RELATIONSHIP BETWEEN THE CTE OF ROD 2 AND ROD 3 REQUIRED TO ACHIEVE ATHERMALIZATION FOR DIFFERENT LENGTHS OF ROD. THIS DATA WAS CALCULATED ASSUMING $(L=L_1=L_2)$ AND THAT THE LEVER ARM RATIO IS $L_4/L_5=3$

ATHERMAL BRAGG GRATING PACKAGE WITH COURSE AND FINE MECHANICAL TUNING

BACKGROUND OF INVENTION

1. Technical Field

The present invention relates to an optical system; and more particularly, to an optical system for providing athermal sensing of changes in a Bragg grating.

2. Description of Related Art

The majority of prior art athermal Bragg grating designs rely on tensioning in-fiber Bragg gratings via co-linear or concentric coatings or inserts. Performance of these designs is highly dependent on the repeatability of the manufacturing process, as well as on the thermomechanical properties of the coatings, adhesives, inserts, etc. In addition, these designs do not afford a post-manufacturing adjustment to accurately tune the response of the grating to precisely and repeatably achieve the desired temperature sensitivity specifications. As a result, more stringent manufacturing is required, thus leading to reduced yields and limited performance. Finally, none of the current technologies take advantage of simple levering concepts to widen the athermal grating design space.

SUMMARY OF INVENTION

The present invention provides an athermal grating design having a Bragg grating unit and a lever arrangement.

In operation, the Bragg grating unit responds to an optical signal, a change of temperature and a lever force for offsetting thermally-induced changes in the Bragg grating unit, for providing a Bragg grating unit signal that does not change in relation to the change of temperature.

Further, the lever arrangement responds to the change of temperature, for providing the level force to the Bragg grating unit to compensate for the change in the temperature.

The Bragg grating unit may include a large diameter waveguide cane structure.

The lever arrangement may include a top plate, a bottom plate, a lever arm pivotally coupled between the top plate and the bottom plate, and a rod coupled between the top plate and the bottom plate on one side of the lever arm. The Bragg grating unit is arranged between the top plate and the bottom plate on another side of the lever arm.

The level arm and the rod have different coefficients of expansion. The level arm is adjustably coupled between the top plate and the bottom plate. The level arm is attached to the top plate by a pin joint, and is attached to the bottom plate via a threaded nut and screw arrangement.

The threaded nut and screw arrangement may include a nut or other fastening device that is tightened to compress both the rod and the Bragg grating unit.

The rod is adjustably coupled between the top plate and the bottom plate. As shown, the rod includes a threaded post having course threads for coarsely adjusting the pre-compression of the rod between the top plate and the bottom plate. The rod includes a threaded rod having fine threads for finely adjusting the pre-compression of the rod between the top plate and the bottom plate.

The lever force for offsetting thermally-induced changes in the Bragg grating unit depends on and is determined by the coefficient of thermal expansion of the lever, rod and Bragg grating unit; the Young's modulus of the lever, rod and Bragg grating unit; cross-section of the lever, rod and Bragg grating unit; the lengths of the lever, rod and Bragg grating unit; the distance between the lever and the rod; or the distance between the lever and the Bragg grating unit, or a combination thereof.

In one embodiment, the coefficient of thermal expansion of the lever is less than the coefficient of thermal expansion of the rod so as to tune the Bragg grating unit by compression. In another embodiment, the coefficient of thermal expansion of the lever is greater than the coefficient of thermal expansion of the rod so as to tune the Bragg grating unit by tension. In this case, the Bragg grating unit may be an optical fiber having a bragg grating therein.

The foregoing and other objects, features and advantages of the present invention will become more apparent in light of the following detailed description of exemplary embodiments thereof, as illustrated in the accompanying drawing.

BRIEF DESCRIPTION OF THE DRAWING

The drawing includes FIGS. 1–4, and the following is a brief description thereof.

DETAILED DESCRIPTION OF THE INVENTION

Figure 1:
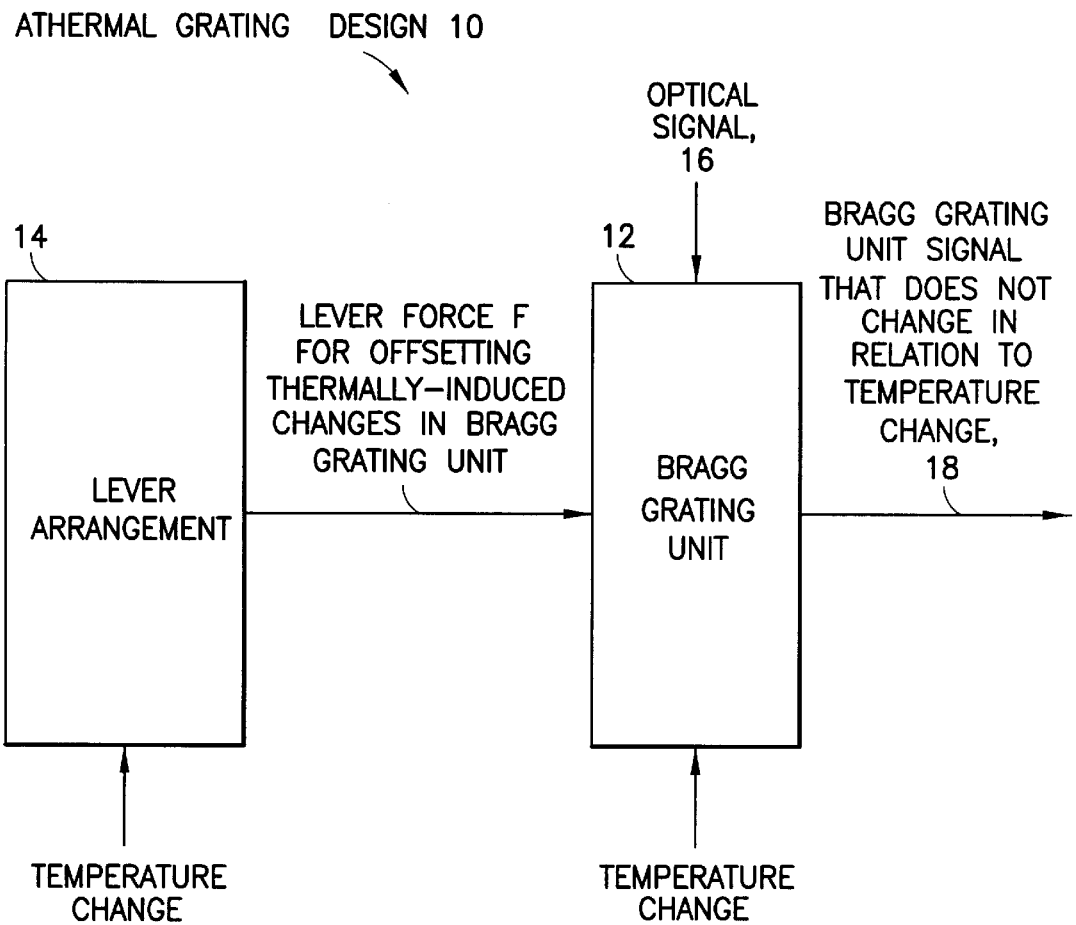
FIG. 1 is a block diagram of an athermal grating design that is the subject matter of the present invention.

FIG. 1: The Basic Invention

FIG. 1 shows the basic invention, which provides an athermal grating design generally indicated as 10 having a Bragg grating unit 12 and a lever arrangement 14.

In operation, the Bragg grating unit 12 responds to an optical signal provided along an optical fiber 16, a change of ambient temperature and a lever force F for offsetting thermally-induced changes in the Bragg grating unit 12, for providing a Bragg grating unit signal along an optical fiber 18 that does not change in relation to change of temperature.

Further, the lever arrangement 14 responds to the change of temperature, for providing the level force to the Bragg grating unit to compensate for the change in the temperature.

The Bragg grating unit 12 may include a Bragg grating formed therein, and, in particular, may include a large diameter waveguide cane structure having a Bragg grating formed therein, and shown and discussed in more detail below in relation to FIG. 2.

In effect, the lever force is a compensating force that compensates for a physical change in the dimensionality of the Bragg grating in the Bragg grating unit 12 caused by the change in the temperature that, in turn, would cause an optical change in the response of the Bragg grating unit 12. For example, when the Bragg grating increases in temperature, it will expand causing an increase in the wavelength reflected by the Bragg grating unit. In contrast, when the Bragg grating unit decreases in temperature, the Bragg grating unit will shrink causing a decrease in the wavelength reflected by the Bragg grating unit.

FIG. 2

Figure 2:
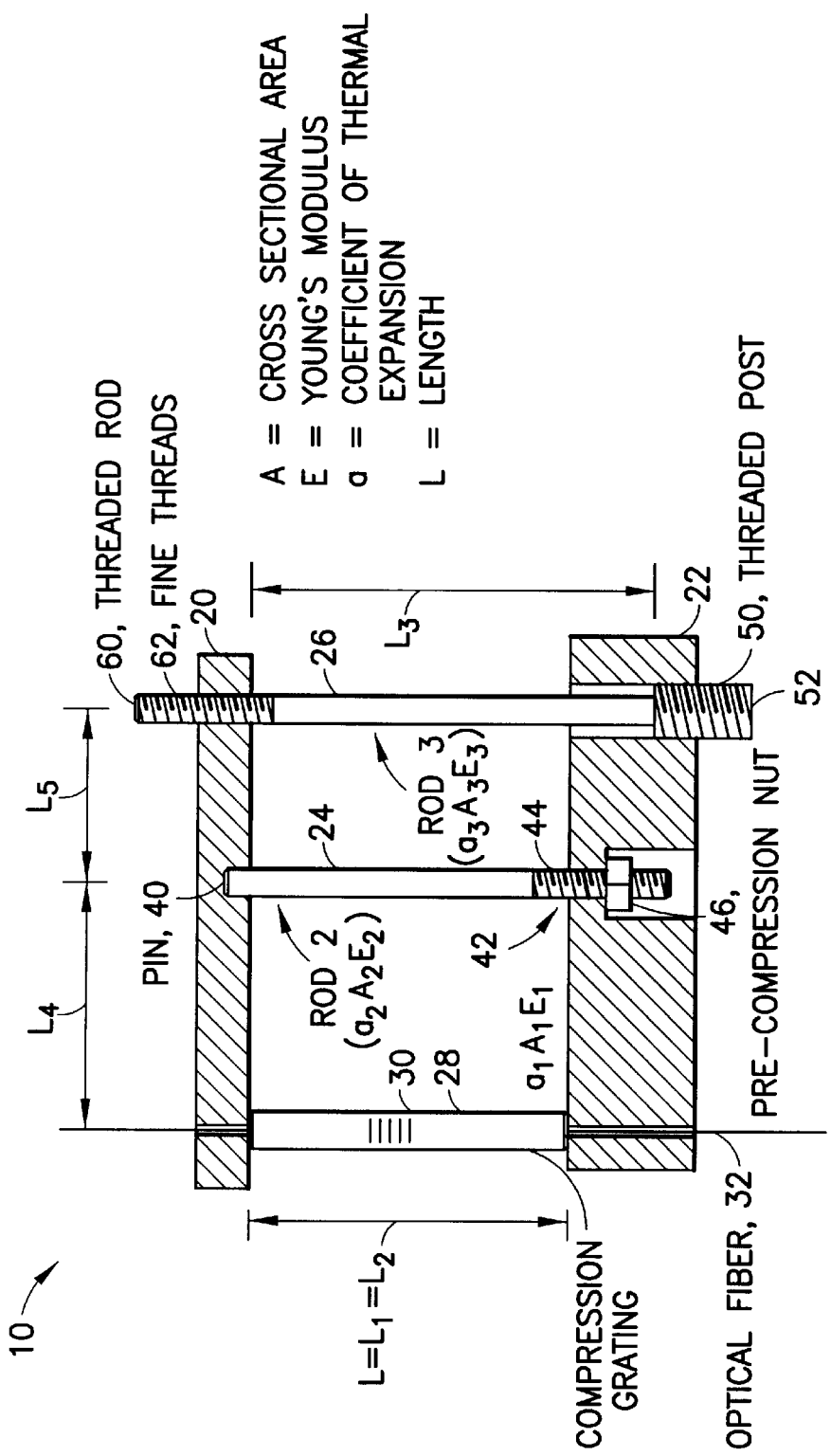
FIG. 2 is a diagram of an embodiment of the athermal grating design shown in FIG. 1.

FIG. 2 shows an embodiment of a levered athermal grating package that allows post-manufacturing tuning to achieve optimal athermalization.

In FIG. 2, the lever arrangement 10 includes a top plate 20, a bottom plate 22, a lever arm 24 (a.k.a. Rod No. 2) pivotally coupled between the top plate 22 and the bottom plate 24, and a rod 26 (a.k.a. Rod No. 3) coupled between the top plate 22 and the bottom plate 24 on one side of the lever arm 24. The Bragg grating unit 12 (FIG. 1) and is in the form of a large diameter waveguide cane structure 28 is arranged between the top plate 20 and the bottom plate 22 on the other side of the lever arm 24. The large diameter waveguide cane structure 28 has a Bragg grating 30 formed therein, and is coupled to an optical fiber 32.

The level arm 24 and the rod 26 have different coefficients of expansion. The level arm 24 is adjustably coupled between the top plate 20 and the bottom plate 22. The level arm 24 is attached to the top plate 20 by a pin joint 40, and is attached to the bottom plate 22 via a threaded nut and screw arrangement generally indicated as 42. The scope of the invention is intended to include other types of joints for attaching the level arm to the top plate, as well as other types of mechanical arrangements for attaching the level arm to the bottom plate.

The threaded nut and screw arrangement 42 includes a thread 44 on the lever arm 24 and a pre-compression nut 46. The pre-compression nut 46 is tightened to compress both the rod 26 and the large diameter waveguide cane structure 28 of the Bragg grating unit 12 (FIG. 1).

The rod 26 is adjustably coupled between the top plate 20 and the bottom plate 22. The rod 26 includes a first threaded post having course threads 52 for coarsely adjusting the pre-compression of the rod 26 between the top plate 20 and the bottom plate 22. The rod 26 also includes a second threaded rod 60 having fine threads 62 for finely adjusting the pre-compression of the rod 26 between the top plate 20 and the bottom plate 22. The scope of the invention is intended to include other types of mechanical coupling arrangements for coarsely and finely adjusting the pre-compression of the rod between the top plate and the bottom plate.

The lever force for offsetting thermally-induced changes in the Bragg grating unit depends on and is determined by the coefficient of thermal expansion of the lever arm 24, the rod 26 and the large diameter waveguide cane structure 28 of the Bragg grating unit 12 (FIG. 1); the Young's modulus of the lever arm 24, the rod 26 and the large diameter waveguide cane structure 28; the cross-section of the lever arm 24, the rod 26 and the large diameter waveguide cane structure 28; the lengths of the lever arm 24, the rod 26 and the large diameter waveguide cane structure 28; the distance between the lever arm 24 and the rod 26; and the distance between the lever arm 24 and the large diameter waveguide cane structure 28, or a combination thereof.

In the preferred embodiment, the coefficient of thermal expansion of the lever arm 24 is less than the coefficient of thermal expansion of the rod 26 so as to tune the large diameter waveguide cane structure 28 by compression. However, embodiments are also envisioned in which the coefficient of thermal expansion of the lever arm 24 is greater than the coefficient of thermal expansion of the rod 26 so as to tune the large diameter waveguide cane structure 28 by stretching or tension.

In effect, the present invention provides a simple levering design or technique with adjustable components to develop forces on the large diameter waveguide cane structure 28. These forces are chosen such that they exactly offset thermally-induced changes in Bragg grating wavelength. The large diameter waveguide cane structure 28 acts as one of three rods separating top and bottom plates 20, 22. The lever arm 24 is attached to the top plate 20 by the pin joint 40 to allow pivoting, and attach to the bottom plate 22 via the threaded screw/nut arrangement 42. The pre-compression nut 46 is tightened to pre-compress both the large diameter waveguide cane structure 28 and the rod 26 (also shown as rod 3 (far right)). The rod 26 is attached to the top and bottom plates 20, 22 via the fine threads 62 at the top and contacted with the threaded post having the course threads 52 on the bottom. The fine thread pitch 62 at the top of the threaded rod 60 is used to provide a fine adjustment to the length ($L_3$) of the rod 26. The threaded post 50 has the coarser thread pitch 52 to provide for large changes to the length ($L_3$) of the rod 26. Adjusting the length ($L_3$) of the rod 26 is the primary means of tuning the athermalization of the large diameter waveguide cane structure 28.

If the materials and cross-sectional areas of the lever arm 24 and the rod 26 are selected correctly (relative to those of the large diameter waveguide cane structure 28), an increase in temperature will cause the Bragg grating 30 to compress, and a decrease in temperature will cause the Bragg grating 30 to extend, thereby off-setting the thermo-optic response of the Bragg grating 30. The ratio of the lengths comprising the lever arm ($L_4/L_5$) is one of the design variables of this invention, as it controls the magnitude of the lever force F applied to the Bragg grating 30.

The CTEs, Young's modulii, cross-sectional areas, and lengths of the various elements must be selected appropriately in order to achieve athermalization. A mathematical model of the invention was developed assuming that the top plate is rigid, $A_1E_1=A_3E_2=A_2E_3$, the CTE ($\alpha_2$) of the lever arm 24 is less than the CTE ($\alpha_3$) of the rod 26, and the length $L_3$ is adjustable. (It is important to note that the invention is not intended to be limited to $A_1E_1=A_2E_2=A_3E_3$, because any combination of $A_1E_1$, $A_2E_2$, $A_3E_3$ will do.) This model included the potential for changing the pre-compression via the rod 26. The assumption $A_1E_1=A_2E_2=A_3E_3$ is valid because one is free to select the cross-sectional areas of the lever arm 24 and the rod 26. Selected results from this model are provided in FIGS. 3 and 4.

FIG. 3

Figure 3:
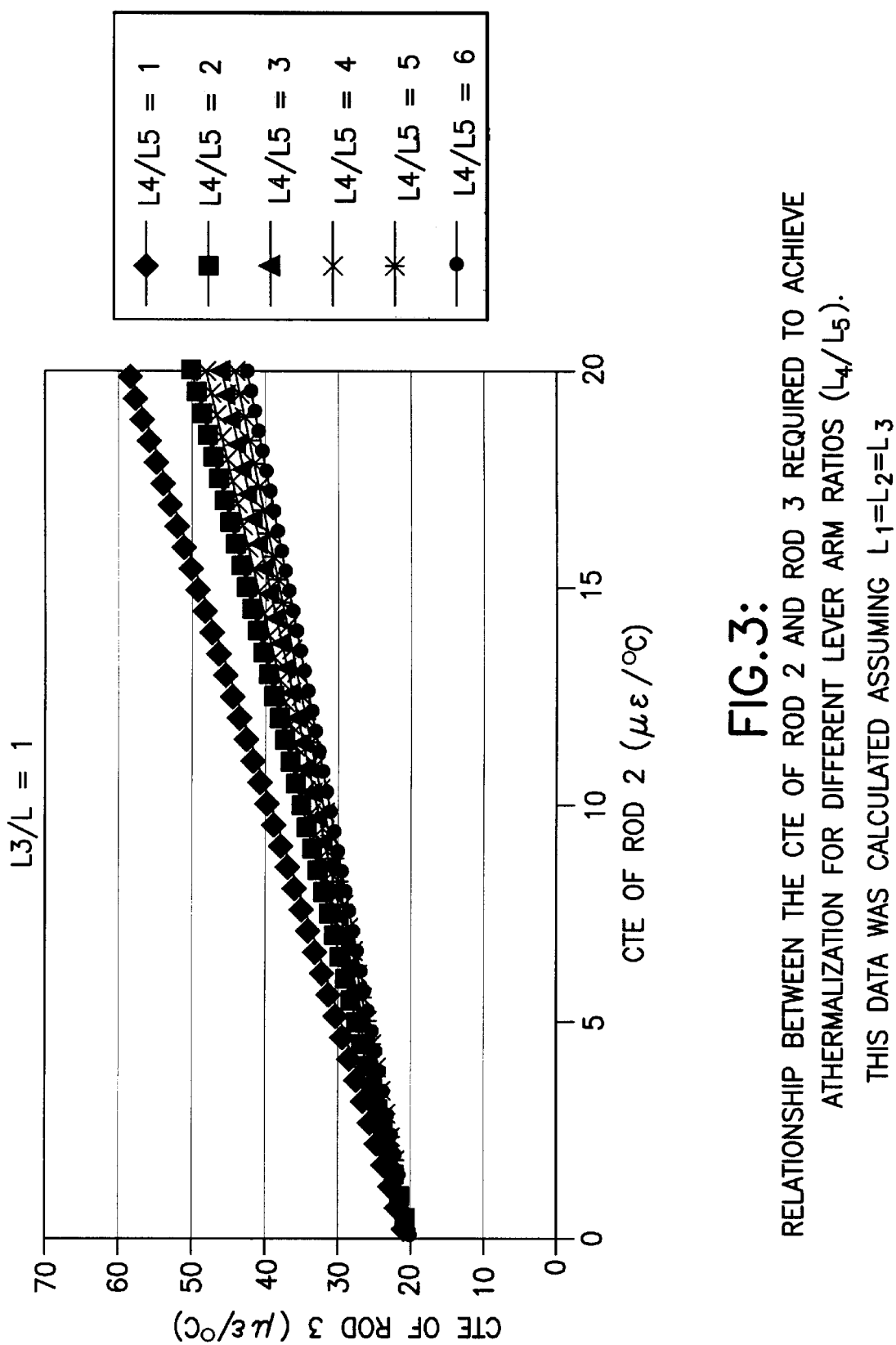
FIG. 3 is a graph of the coefficient of thermal expansion of rod no. 2 versus rod no. 3 of the athermal grating design shown in FIG. 2 for different lever arm ratios.

FIG. 3 shows a relationship between the CTE of the Rod No. 2 (i.e. the lever arm 24) and the Rod No. 3 (i.e. the rod 26) required to achieve athermalization for different lever arm ratios ($L_4/L_5$). By way of example, this data was calculated assuming $L_1=L_2=L_3$. (It is important to note that the invention is not intended to be limited to $L_1=L_2=L_3$, because other combination of $L_1$, $L_2$, $L_3$ will do.) Moreover, this calculation is done for a variety of lever arm configurations denoted by the ratio $L_4/L_5$, and assuming, for example, that the length of Rod No. 3 equals the lengths of the compression grating and the Rod No. 2, i.e., $L_1=L_2=L_3$. FIG. 3 indicates that in order to achieve athermalization for a practical range of CTEs for Rod No. 2, the CTE of the Rod No. 3 would have to be relatively high (greater than 20 $\mu\epsilon/°$ C.). More reasonable values for the CTE of Rod No. 3 can be achieved by: (1) changing the dimensions and Young's modulii used for the Rod No. 2 and the Rod No. 3, or (2) changing the length of the Rod No. 3.

FIG. 4

Figure 4:
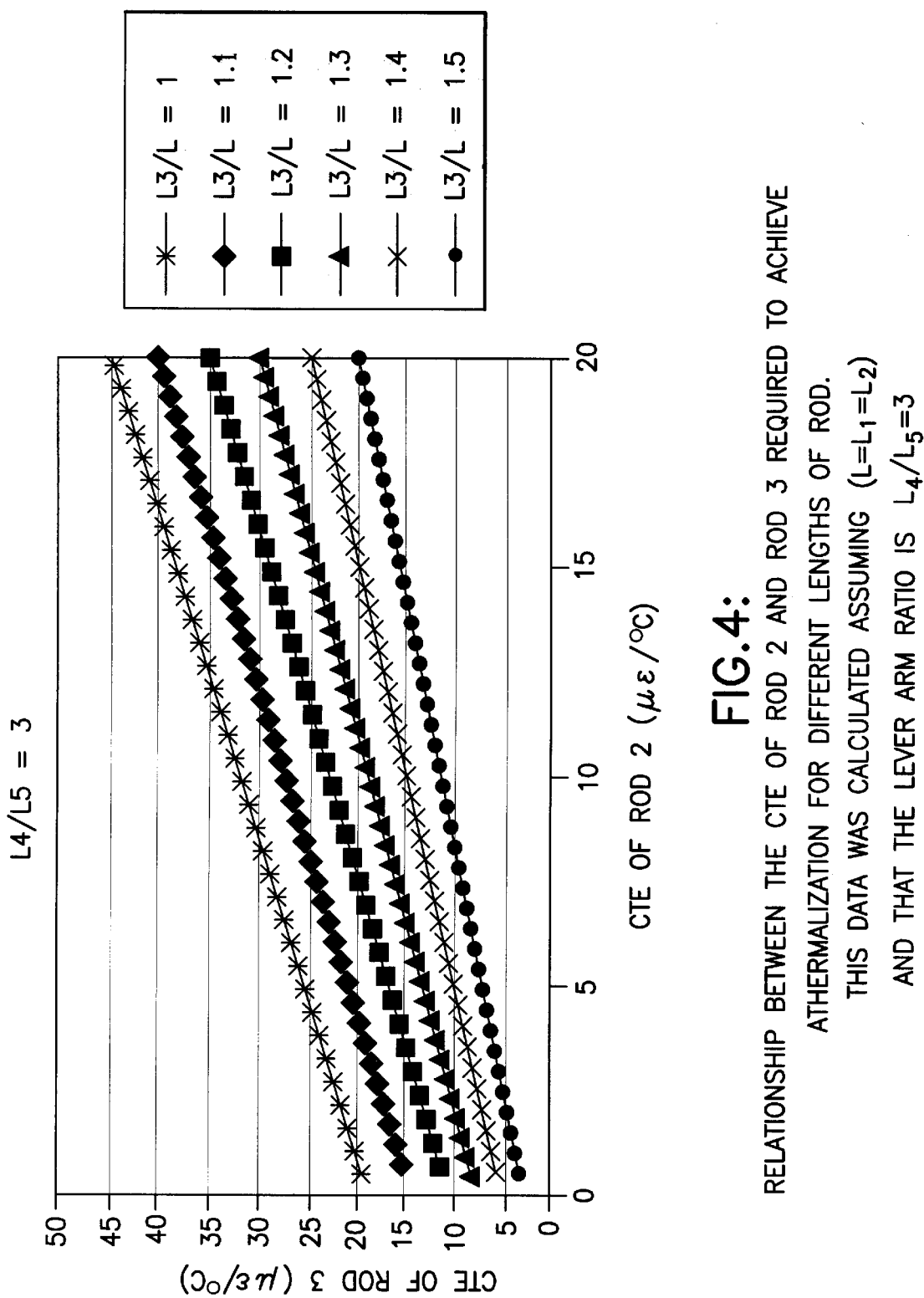
FIG. 4 is a graph of the coefficient of thermal expansion of rod no. 2 versus rod no. 3 of the athermal grating design shown in FIG. 2 for different lengths of rods.

FIG. 4 shows the relationship between the CTE of Rod No. 2 and Rod No. 3 required to achieve athermalization for different rod lengths. By way of example, this data was calculated assuming ($L=L_1=L_2$) and that the lever arm ratio is $L_4/L_5=3$. (It is important to note that the invention is not intended to be limited to $L_1=L_2=L_3$ and $L_4/L_5=3$, because other combination of $L_1$, $L_2$, $L_3$ and other ratios of $L_4/L_5$ will do.) FIG. 4 shows design results for the condition where the lever arm is fixed at $L_4/L_5=3$, and the length of Rod No. 3 is varied. Notice that increasing the length of Rod No. 3 has the effect of shifting the design curve downwards along the vertical axis, indicating that more practical values for the CTE of Rod No. 3 are now within the design space. As a result, one can view changing the length of Rod No. 3 as a means of modifying the acceptable design space. Alternatively, adjusting the length of Rod No. 3 can be viewed as a mechanism for adjusting the athermal package to compensate for the inevitable variability in manufacturing, uncertainty in thermomechanical properties of the components, and any other mechanism that causes difficulty in achieving precise athermalization.

Unique Qualities of the Invention

The invention has the following unique qualities: (1) Simple design taking advantage of the CiDRA compression grating; (2) Uses a levered mechanism; (3) Large design space (lever arm ratio, CTEs, Young's modulii, cross-sectional areas, and lengths) compared to traditional athermal grating designs.

The present invention also uses stock material rather than grown coatings, which are notoriously difficult to produce with consistent thermomechanical properties, allows for post-manufacture fine-tuning to achieve optimum athermalization, and avoids the use of epoxy (and other) adhesives.

The assignee of the instant patent application has filed other patent applications having athermal grating designs, including patent application Ser. No. 09/519,240 (CiDRA file No. CC-0234), filed Mar. 6, 2000, entitled Temperature Compensated Optical Device," hereby incorporated by reference. The present invention offers a wider design space and the post-manufacturing tuning, and may be simpler to manufacture.

The Large Diameter Waveguide Cane Structure

As discussed above, the Bragg grating unit may be implemented as a separate structure in the form of a large diameter waveguide cane structure 28. In one embodiment, the large diameter waveguide cane structure is formed by taking the optical fiber 32 and inserting it into an alignment tube (not shown) having an inner diameter just larger than that of the outer diameter of the fibers, which is then collapsed on the optical fiber 32. For example, such glass collapsing technology is shown and described in U.S. patent application Ser. No. 09/455,867 (CiDRA File No. CC-0036B), filed Dec. 6, 1999, as well as U.S. patent application Ser. No. 09/455,865 (CiDRA File No. CC-0078B), filed Dec. 6, 1999, both hereby incorporated by reference in their entirety. In particular, this glass collapsing technology relates to collapsing a 1 millimeter tube onto the optical fiber 32, then optionally further collapsing a 3 millimeter tube (not shown) onto the 1 millimeter tube (not shown).

Alternatively, the large diameter waveguide cane structure 28 may also be formed of a single large diameter waveguide having a core with the gratings spaced therein, also known as a fiber cane. For examples of embodiments of fiber cane structures, see U.S. patent application Ser. No. 09/455,868 (CiDRA File No. CC 0230), filed Dec. 6, 1999, as well as U.S. patent application Ser. No. 09/456,112 (CiDRA File No. CC 0129B), filed Dec. 6, 1999, both hereby incorporated by reference in their entirety. In one embodiment described therein, the fiber cane has an outer cladding and an inner core which propagates light. The cladding has an outer waveguide dimension greater than about 0.3 millimeters. The core has an outer core dimension of less than about 12.5 microns. In this case, the optical fiber 32 would be coupled to the large diameter waveguide cane structure 28 by known techniques such as by a bonding or an epoxy. The scope of the invention is not intended in any way as to how the optical fiber 32 would be coupled to the large diameter waveguide cane structure 28.

Alternate Embodiments

1) The scope of the invention is not intended to be limited to the geometry of the lever arm 24, the rod 26 and the plates 20, 22. For example, any basic geometry of the rods and plates performing the same basic function.

2) The scope of the invention is not intended to be limited to the geometry of the levering arrangement shown in FIG. 2. For example, the scope of the invention is intended to cover any levering geometry involving two or more lever and rod combinations.

3) The scope of the invention is not intended to be limited to the geometry of the levering arrangement shown in FIG. 2. For example, the scope of the invention is intended to cover any levering geometry where the rods can come from the top or bottom.

4) The scope of the invention is not intended to be limited to the geometry of the levering arrangement having straight rods as shown in FIG. 2. For example, the scope of the invention is intended to cover any levered geometry where the rods or plates are not straight.

5) The scope of the invention is not intended to be limited to the specific connection mechanism between the rods and plates shown in FIG. 2. For example, the scope of the invention is intended to cover any connection mechanism between the rods and plates.

6) The scope of the invention is intended to cover the same configuration used in a tension-mode by interchanging the position of the grating with that of Rod No. 2. A standard in-fiber Bragg grating would typically be used in this case.

7) The scope of the invention is intended to cover a non-rigid top (and bottom) plate.

8) The scope of the invention is intended to cover embodiments in which the lengths of Rod No. 2 or the grating are made variable to yield alternate fine-tuning methods.

9) The scope of the invention is intended to cover embodiments in which the lever arm ratio is made adjustable to yield another fine-tuning method.

10) The scope of the invention is intended to cover embodiments where a grating is bonded to a flexible top-plate and the compression grating replaced with a rod identical to the rod 26 shown in FIG. 2.

SCOPE OF THE INVENTION

Although the invention has been described and illustrated with respect to exemplary embodiments thereof, the foregoing and various other additions and omissions may be made therein and thereto without departing from the spirit and scope of the present invention.

I claim:

1. An athermal grating design comprising:
   a Bragg grating unit including an optical waveguide having an outer transverse diameter of about 0.3 millimeters or greater and a Bragg grating disposed therein, the optical waveguide being responsive to an optical signal, further responsive to a change of temperature, and further responsive to a compressive force for offsetting thermally-induced changes in the Bragg grating unit, for providing a Bragg grating unit signal that does not change in relation to change of temperature; and a lever arrangement, responsive to the change of temperature, for providing the compressive force to the Bragg grating unit to compensate for the change in the temperature.

2. An athermal grating design according to claim 1, wherein the lever arrangement further comprises:

a top plate, a bottom plate, a lever arm pivotally coupled between the top plate and the bottom plate, and a rod coupled between the top plate and the bottom plate on one side of the lever arm; and wherein the Bragg grating unit is arranged between the top plate and the bottom plate on another side of the lever arm.

3. An athermal grating design according to claim 2, wherein the level arm and the rod have different coefficients of expansion.

4. An athermal grating design according to claim 2, wherein the level arm is adjustably coupled between the top plate and the bottom plate.

5. An athermal grating design according to claim 2, wherein the level arm is attached to the top plate by a pin joint, and is attached to the bottom plate via a threaded nut and screw arrangement.

6. An athermal grating design according to claim 5, wherein the threaded nut and screw arrangement includes a nut that is tightened to compress both the rod and the Bragg grating unit.

7. An athermal grating design according to claim 2, wherein the rod is adjustably coupled between the top plate and the bottom plate.

8. An athermal grating design according to claim 7, wherein the rod includes a threaded post having course threads for coarsely adjusting the pre-compression of the rod between the top plate and the bottom plate.

9. An athermal grating design according to claim 7, wherein the rod includes a threaded rod having fine threads for finely adjusting the pre-compression of the rod between the top plate and the bottom plate.

10. An athermal grating design according to claim 7, wherein the lever force for offsetting thermally-induced changes in the Bragg grating unit depends on and is determined by the coefficient of thermal expansion of the lever, rod and Bragg grating unit; the Young's modulus of the lever, rod and Bragg grating unit; cross-section of the lever, rod and Bragg grating unit; the lengths of the lever, rod and Bragg grating unit; the distance between the lever and the rod; or the distance between the lever and the Bragg grating unit, or a combination thereof.

11. An athermal grating design according to claim 3, wherein the coefficient of thermal expansion of the lever is less than the coefficient of thermal expansion of the rod so as to tune the Bragg grating unit by compression.

12. An athermal grating design according to claim 3, wherein the coefficient of thermal expansion of the lever is greater than the coefficient of thermal expansion of the rod so as to tune the Bragg grating unit by tension.

13. An athermal grating design according to claim 1, wherein the Bragg grating is arranged along an axis of compression of the optical waveguide, and the lever arrangement applies the compressive force along the axis of compression.

* * * * *

UNITED STATES PATENT AND TRADEMARK OFFICE
CERTIFICATE OF CORRECTION

PATENT NO. : 6,453,108 B1
DATED : September 17, 2002
INVENTOR(S) : James S. Sirkis It is certified that error appears in the above-identified patent and that said Letters Patent is hereby corrected as shown below:

<u>Column 4,</u>
Line 31, "$A_1E_1=A_3E_2=A_2E_3$" should be -- $A_1E_1=A_2E_2=A_3E_3$ --.

Signed and Sealed this

Fourth Day of March, 2003

Attest:

Attesting Officer

JAMES E. ROGAN
*Director of the United States Patent and Trademark Office*